United States Patent
Behera

(10) Patent No.: US 6,535,879 B1
(45) Date of Patent: Mar. 18, 2003

(54) ACCESS CONTROL VIA PROPERTIES SYSTEM

(75) Inventor: Prasanta Behera, Fremont, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/507,536

(22) Filed: Feb. 18, 2000

(51) Int. Cl.[7] .............................................. G06F 17/30
(52) U.S. Cl. ........................................................ 707/9
(58) Field of Search ....................... 707/9, 10; 713/200, 713/201

(56) References Cited

U.S. PATENT DOCUMENTS

| | | | | |
|---|---|---|---|---|
| 5,696,898 A | * | 12/1997 | Backer et al. ............... | 713/201 |
| 5,701,458 A | * | 12/1997 | Bsaibes et al. .................. | 707/9 |
| 5,761,669 A | * | 6/1998 | Montague et al. ....... | 707/103 R |
| 6,061,726 A | * | 5/2000 | Cook et al. .................. | 709/220 |
| 6,233,576 B1 | * | 5/2001 | Lewis ............................ | 707/9 |
| 6,275,825 B1 | * | 8/2001 | Kobayashi et al. ........... | 705/52 |

FOREIGN PATENT DOCUMENTS

EP  0955761 A1 * 10/1999

* cited by examiner

*Primary Examiner*—Jack Choules
(74) *Attorney, Agent, or Firm*—Glenn Patent Group; Michael A. Glenn

(57) ABSTRACT

An access control via properties system provides ACL rules based on the properties associated with the entries, thereby taking advantage of the fact that there are inherent properties associated with each entry and does not require any changes to the schema. Once the server supports the invention, the system administrator creates a few simple ACL rules and is done. The invention structures the ACL rule such that it indicates the attributes that the administrator has selected for user access and specifies the type of access to be granted to a user which can include: read, write, or any other privileges that the system supports. The desired attributes that the user must have to be granted such access is also listed along with the attribute fieldname associated with the desired attributes. The directory server will match the desired attributes within the specified attribute fieldname with the user's attributes and allows access to the directory entry only if the user has the desired attribute values. Alternatively, a match function can be specified for the desired attributes where the directory server matches the desired attributes with the user and the owner of the list of attributes and allows access to the directory entry only if the both the user and the owner have the desired attribute values. When a user accesses a directory entry, the directory server selects and analyzes a specific access control command according to the attribute being accessed.

12 Claims, 8 Drawing Sheets

501 dn: uid=prasanta,ou=People,o=Netscape Communications Corp.,c=US
sn: Behera
uid: prasanta
employeetype: employee
mail: prasanta@netscape.com
telephonenumber: 9999
objectclass: top
objectclass: person
ou: Directory Server
ou: Mission Control Development
ou: Server Products Division
l: Mountainview
cn: Prasanta Behera
postaladdress: 501 E. Middlefield Road, Mountain View, CA 94043, USA
givenname: Prasanta
manager: uid=claire, ou=People,o=Netscape Communications Corp.,c=US

502

Fig. 5

ACCESS CONTROL VIA PROPERTIES SYSTEM

BACKGROUND OF THE INVENTION

1. Technical Field

The invention relates to accessing information from a directory structure in a computer environment. More particularly, the invention relates to controlling access to data within an LDAP directory structure in a computer environment.

2. Description of the Prior Art

A Lightweight Directory Access Protocol (LDAP) directory (such as Netscape Communications Corporation's Directory Server) is a collection of "entries." Each entry has a name (called the Distinguished Name) and a list of attribute values. The entries in a directory are organized in a tree structure, with major groupings that are subdivided into smaller units. A directory might contain several organization entries, each of which contains several organizationalUnit entries. These entries can be further subdivided.

LDAP provides search operations that can be performed over specified portions of the directory tree. Trees and subtrees, therefore, are a natural way to deal with data stored in an LDAP directory.

Entries and attributes correspond to a wide variety of data types such as personnel information, server configuration, business relationships, and user preferences. Since all entries are stored within a single directory, a method is required to restrict the availability of specific information to authorized users.

The method used to control access is via Access Control Lists (ACL). The Directory Server Administrator (DSAdmin) creates some basic ACL rules that grant permission to certain users to access various information in the directory. Most of the security considerations will require from tens to hundreds of rules to implement. The smaller number of ACL rules offers better performance and easier manageability.

Because a directory is the critical central repository in an intranet containing collections of information, e.g., about people, it is imperative that a rich set of access options/features be provided.

A medium to large company may have thousands of departments. Consequently, the DSAdmin has to create thousands of groups and ACL rules to handle those departments. Additionally, if a person leaves or joins the company, the DSAdmin must delete or add that person to a (possibly large) number of groups.

It would be advantageous to provide a access control via properties system that gives the system administrator the ability to easily specify particular information in a directory that are accessible by users that have a specific set of attributes. It would further be advantageous to provide an access control via properties system that reduces the burden on the system administrator and server of maintaining and storing the large number of groups, roles, and access rules that are traditionally required to support large directory systems.

SUMMARY OF THE INVENTION

The invention provides an access control via properties system. The system provides a simple command language that allows a system administrator to manage access to directory information by easily specifying the particular directory information and the desired attributes of the users that are allowed access. In addition, the invention provides a system that does not require the large number of groups, roles, and ACL rules needed by traditional approaches to support a directory system.

A preferred embodiment of the invention provides ACL rules based on the properties associated with the entries, thereby taking advantage of the fact that there are inherent properties associated with each entry. The invention does not require any changes to the schema. Rather, once the server supports the invention, the system administrator creates a few simple ACL rules and is done.

The invention structures the ACL rule such that it indicates the attributes that the administrator has selected for user access. The administrator specifies the type of access to be granted to a user which can include: read, write, or any other privileges that the system supports. The desired attributes that the user must have to be granted such access is also listed.

The attribute fieldname associated with the desired attributes is specified in the access control command. The directory server will match the desired attributes within the specified attribute fieldname with the user's attributes. It will allow access to the directory entry only if the user has the desired attribute values.

Alternatively, a match function can be specified for the desired attributes. The directory server matches the desired attributes with the user and the owner of the list of attributes and allows access to the directory entry only if the both the user and the owner have the desired attribute values.

When a user accesses a directory entry, the directory server selects and analyzes a specific access control command according to the attribute being accessed.

Other aspects and advantages of the invention will become apparent from the following detailed description in combination with the accompanying drawings, illustrating, by way of example, the principles of the invention.

BRIEF DESCRIPTION OF THE DRAWINGS

FIG. 5 is a diagram of an LDAP directory adding an additional attribute to create a finer granularity according to the invention;

DETAILED DESCRIPTION OF THE INVENTION

The invention is embodied in an access control via properties system in a computer environment. A system according to the invention provides a simple command language that allows a system administrator to manage access to directory information by easily specifying the particular directory information and the desired attributes of the users that are allowed access. In addition, the invention provides a system that does not require the large number of groups, roles, and ACL rules needed by traditional approaches to support a directory system.

A Lightweight Directory Access Protocol (LDAP) directory (such as Netscape Communications Corporation's Directory Server) is a collection of "entries." Each entry has a name (called the Distinguished Name) and a list of attribute values. The entries in a directory are organized in a tree structure, with major groupings that are subdivided into smaller units. A directory might contain several organization entries, each of which contains several organizalUnit entries. These entries can be further subdivided.

LDAP provides search operations that can be performed over specified portions of the directory tree. Trees and subtrees, therefore, are a natural way to deal with data stored in an LDAP directory.

Figure 1:
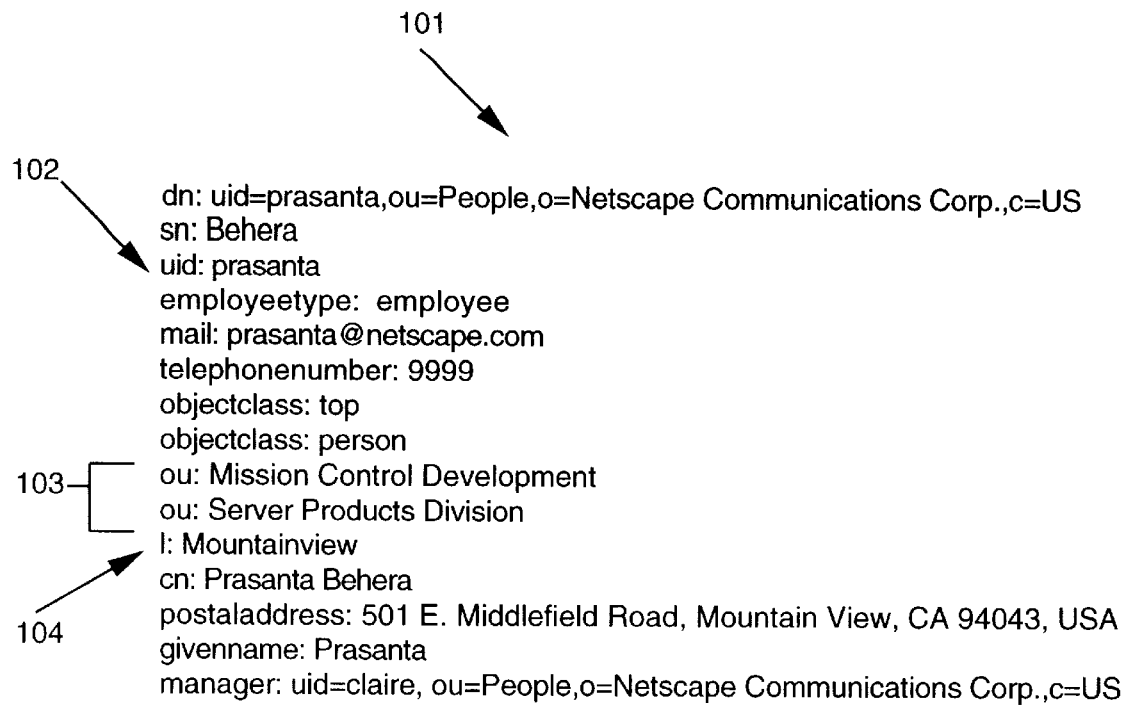
FIG. 1 is a diagram of an LDAP directory entry according to the invention.

Entries and attributes correspond to a wide variety of data types such as personnel information, server configuration, business relationships, and user preferences. Since all entries are stored within a single directory, a method is required to restrict the availability of specific information to authorized users. Referring to FIG. 1, a typical entry 101 in an LDAP server is shown. The user's information such as the user's name (here uid=prasanta) 102 is contained in the entry.

The method used to control access in an LDAP system is via Access Control Lists (ACL). The Directory Server Administrator (DSAdmin) creates basic ACL rules that grant specific users access to certain information in the directory. Most security applications require from tens to hundreds of rules to implement. The smaller number of ACL rules offers better performance and easiermanageability.

There are three ways that a DSAdmin can grant users access privilege:
  implicitly specifying the user in the ACL rules.
  granting access to a group and adding the user to the group.
  granting access to a role and adding that role to the user's roles.

There is nothing new in the three approaches. They all have been in use for a long time. However, imposing the following requirements on the current approaches creates a new problem:
  Allow other users access to some of the information (i.e. some attributes) if they have the same properties, e.g., the same city, department, etc.
  Prevent users from one domain from accessing another domain. For example, if an ISP is hosting coke.com and pepsi.com, the host does not want coke users to see pepsi's data and vice versa. ISPs host tens of thousands of domains.

Figure 2:
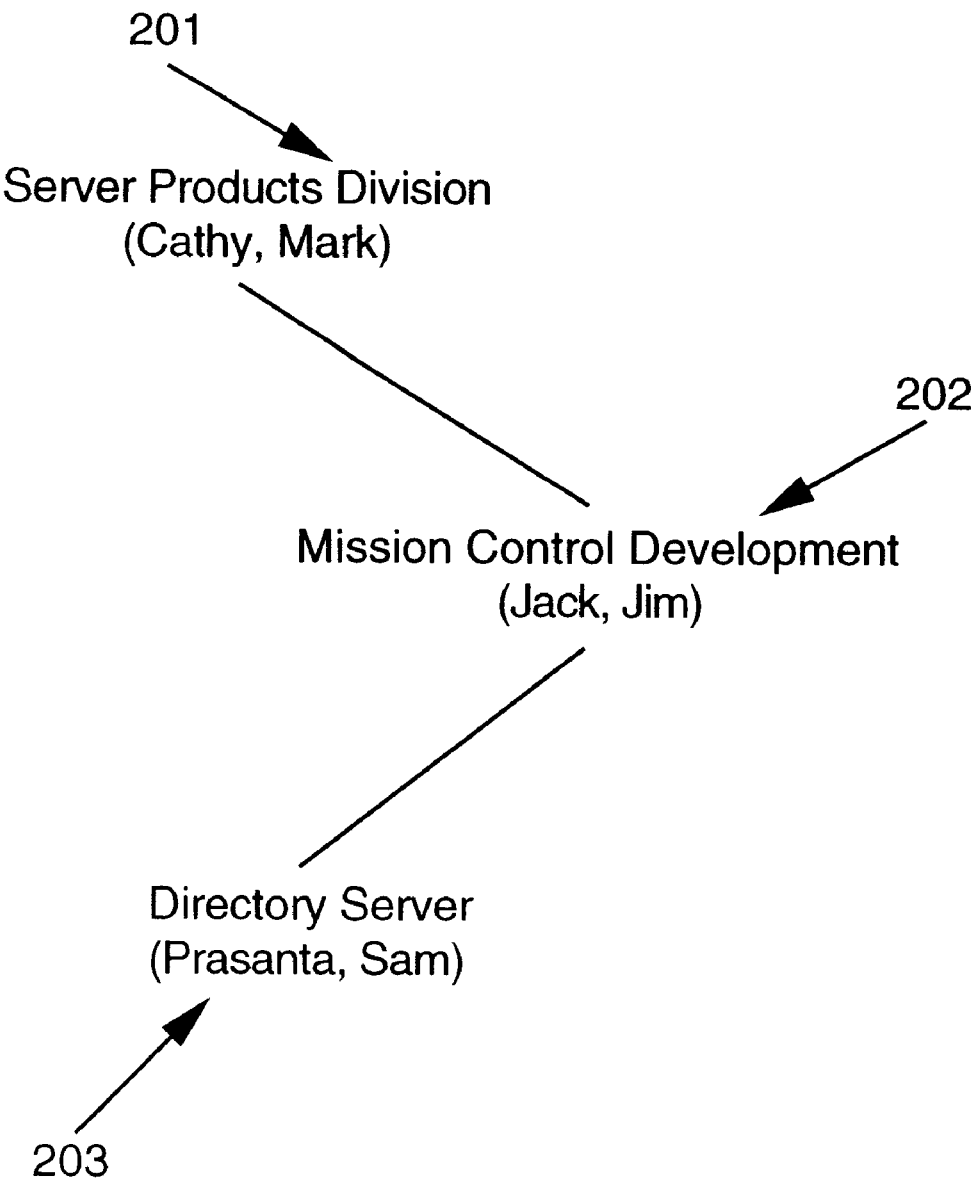
FIG. 2 is a schematic diagram of an example of a directory hierarchy containing sub directories according to the invention.

With respect to FIG. 2, solutions to these scenarios exist today but they are very difficult to manage. For example, given the first case, i.e., people from same departments can access some part of each other's information, the current solution is to create a group, for example, Server Products Division 201, add all the members to the group, and create an ACL which grants access to the group Server Products Division 201.

A medium to large company may have thousands of departments. Consequently, the DSAdmin has to create thousands of groups and ACL rules to handle those departments. Additionally, if a person leaves or joins the company, the DSAdmin must delete or add that person to a (possibly large) number of groups. It is possible that the process of deleting a person from a group can be taken care of automatically by the DSAdmin. However, when departments are merged and/or deleted, reference of those departments must be removed from the ACL rules. Referring again to FIG. 2, a department can also have sub departments. For example, Server Products Division (SPDGroup) 201 has a sub department of Mission Control Development (MCGroup) 202, which has Directory Sever (DSGroup) 203 as a sub department. To support this hierarchical nature, one has to support nested groups or create standalone groups with duplicated information. Nested group evaluations are CPU intensive operations. They also present security hazards unless used carefully. This is a known issue in the security community.

Figure 3:
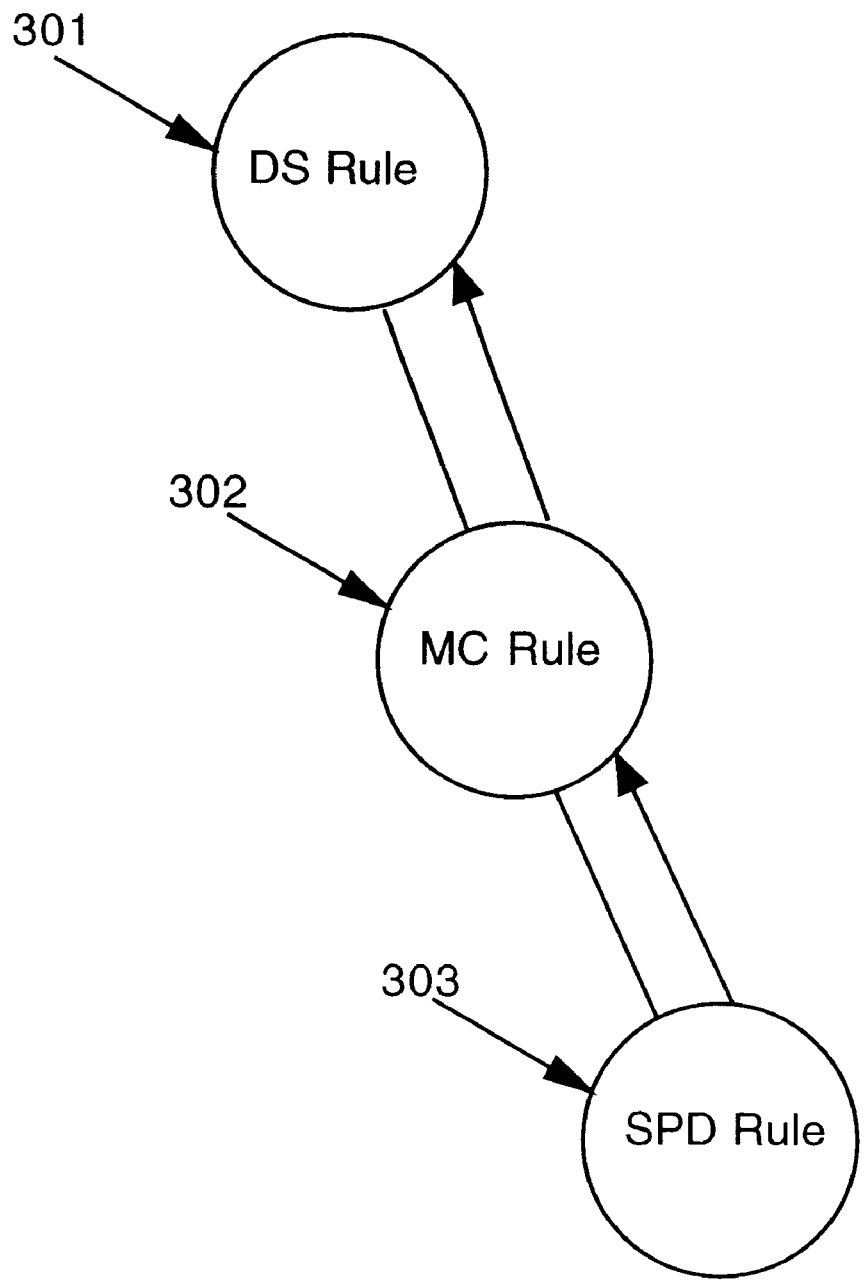
FIG. 3 is a block schematic diagram depicting nested ACL rules required using traditional access systems according to the invention.

With respect to FIG. 3, the DSAdmin has to create nested rules to govern the sub departments. Each set of rules must be used from the broader categories to the more specific categories. Here, to get to the SPD Rule 303 for the SPDGroup, the DS Rule 301 (for the DSGroup) is first referenced, then the MC Rule (for the MC Group), and finally the SPD Rule 303.

Figure 4:
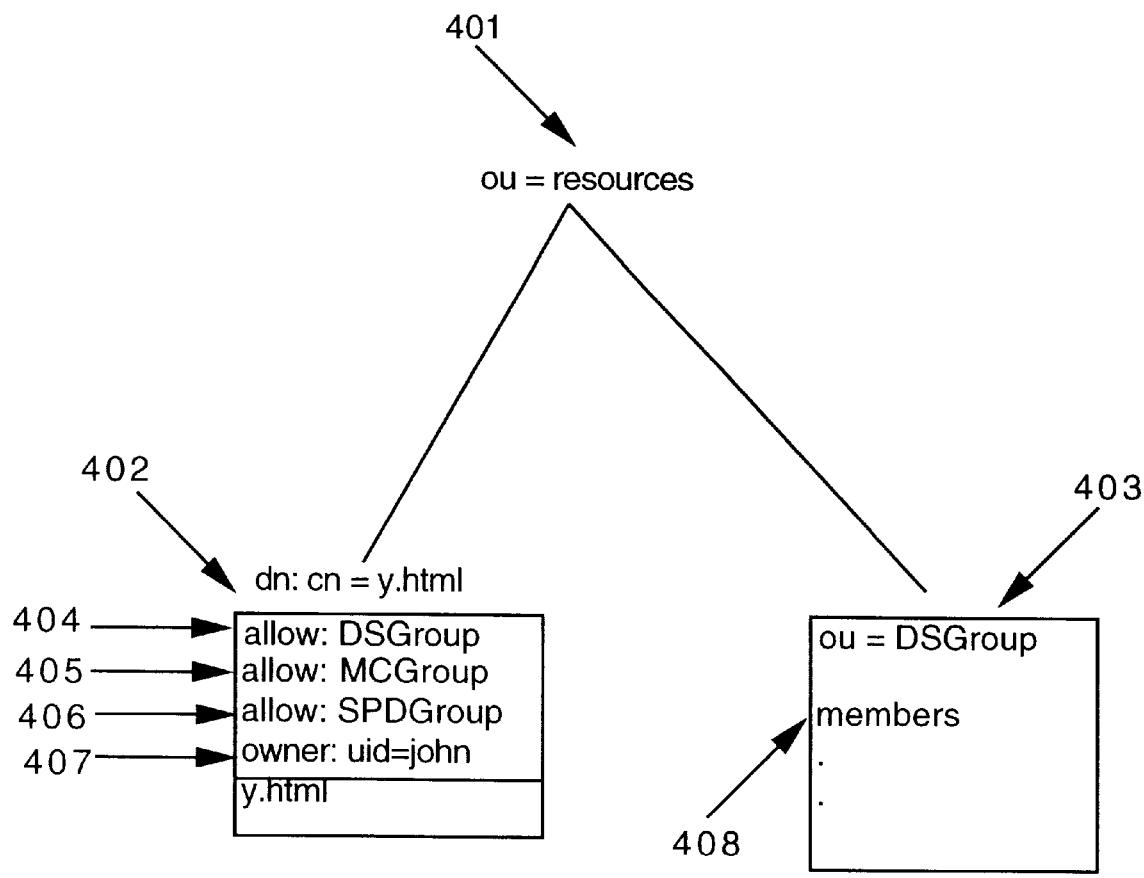
FIG. 4 is a schematic diagram of depicting the creation of groups and members required by traditional access systems according to the invention.

Referring to FIG. 4, when creating access rules to a page "y.html" 402, the DSAdmin had to first create the groups 403 and specify each member of the group 408. Once the groups were created and specified, the DSAdmin then had to create an ACL rule for each group 404, 405, 406. This caused an unnecessary number of rules to be stored and executed.

As noted above, another alternative is to use roles. The DSAdmin must still create hundreds of roles and hundreds of ACL rules to grant access via those roles. Nested role support exists but, as with nested groups, it can be a security issue unless managed properly.

The following is an example of the syntax that the invention uses to set ACL rules.
  Allow access to a specific user:
    ACL: (list of attrs) (allow (read) user="prasanta")
  Allow access to the engineering group:
    ACL: (list of attrs) (allow (read) group= "groupEngineering")
  Allow access based on a role:
    ACL: (list of attrs) (allow (read) role="engineer")

Referring to FIGS. 1 and 5, an example of a person's LDAP directory entry 101 is shown. Attributes are listed that pertain to the particular individual. Here, Prasanta 102 belongs to two departments: Mission Control Development and Server Products Division. The. "ou" attribute 103 contains this information. A finer granularity is achieved by adding "Directory Server" as an "ou" value 502 to Prasanta's entry 501.

Referring again to FIG. 2, the departments and sub departments in the hierarchy of this example each have members have the following people: Cathy and Mark are members of Server Products Division 201; Jack and Jim are members of Mission Control Development 202; and Prasanta and Sam are members of Directory Server. Each level of department includes all of the members of the sub departments below it.

Figure 6:
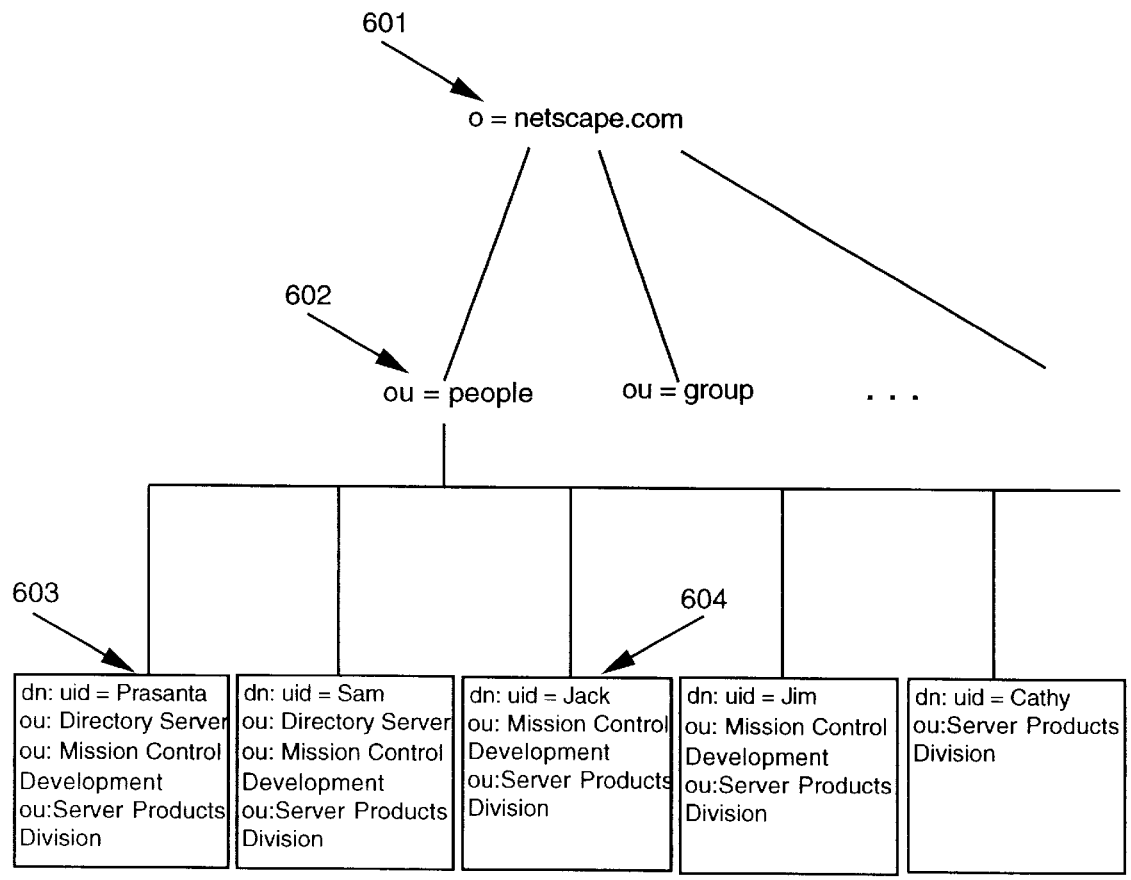
FIG. 6 is a schematic diagram of an example of an LDAP directory hierarchy showing the user entry structure according to the invention.

With respect to FIG. 6, in reality, the LDAP directory structure is a flatter structure than the department hierarchy. In this example, the upper company level o=netscape.com 601 has users, i.e. ou=people 602, as one of its subtrees. The users' directory entries 603, 604 are located under the users node 602. User Prasanta 603 belongs to the Directory.Server Group and user Jack 604 belongs to the Mission Control Development group but both exist on at the same directory level.

The particularity of an ACL rule can be fine tuned by selecting specific sub departments. For example, the security requirements for the departments in FIG. 2 are:

Only Directory Server people can read the values of attributes A1, A2, and A3.

Only Mission Control Development people can read the values A4, A5, and A6.

Only Server Products Division can read the values of attributes A7, A8, A9 and A10.

Using the invention, these security requirements are achieved by simply specifying an ACL rule based on the properties. Here, the rules would be:

ACL1: (A1, A2, A3)(allow(read) matchingAttr="ou= Directory Server")

ACL2: (A4, A5, A6)(allow(read) matchingAttr="ou= Mission Control Development")

ACL3: (A7, A8, A9, A10)(allow(read) matchingAttr= "ou=Server Products Division")

The ACL rule "ACL1" allows Prasanta and Sam to read the values of attributes A1, A2, and A3 because they belong to the same "Directory Server" department. The ACL rule "ACL2" allows Prasanta, Sam, Jack, and Jim to read the value of each other's A4, A5, and A6 attributes because they all belong to the "Mission Control Development" department.

ACL rule "ACL3" allows Prasanta, Sam, Jack, Jim, Cathy, and Mark to read the value of each other's A7, A8, A9 and A10 attributes because they all belong to the "Server Products Division" department.

One skilled in the art will readily appreciate that although LDAP directories are mentioned throughout, the invention can be implemented in any directory application. Additionally, although the examples cited concern attributes pertaining to people, one skilled in the art will readily appreciate that the invention can control access to any attributes stored in a system.

Using the traditional methods, one classifies a user into user, groups, and roles. This creates a need for a classification i.e. a need to create a large number of groups and add members to them or to create lots of roles and assign roles to all the members. In this case, the DSAdmin has to create thousands of groups/roles and also thousands of ACL rules which grant access to those groups/roles. Managing this is a very tedious, error prone, ineffective, and costly approach. The invention provides a unique method whereby the DSAdmin can overcome the above problems by creating just a few ACL rules. This approach is not only highly manageable, cost effective, and less error prone, but is also highly scalable.

In the example above, "ou" had multiple attributed values and the system had to be told which values the ACL applied to. However, if a single valued attribute is used, such as the location attribute "l", then an ACL is created as follows:

ACL: (B1, B2)(allow(read) matchingAttr="l")

This rule grants users from the same location access to the values of the B1 and B2 attributes.

Figure 7:
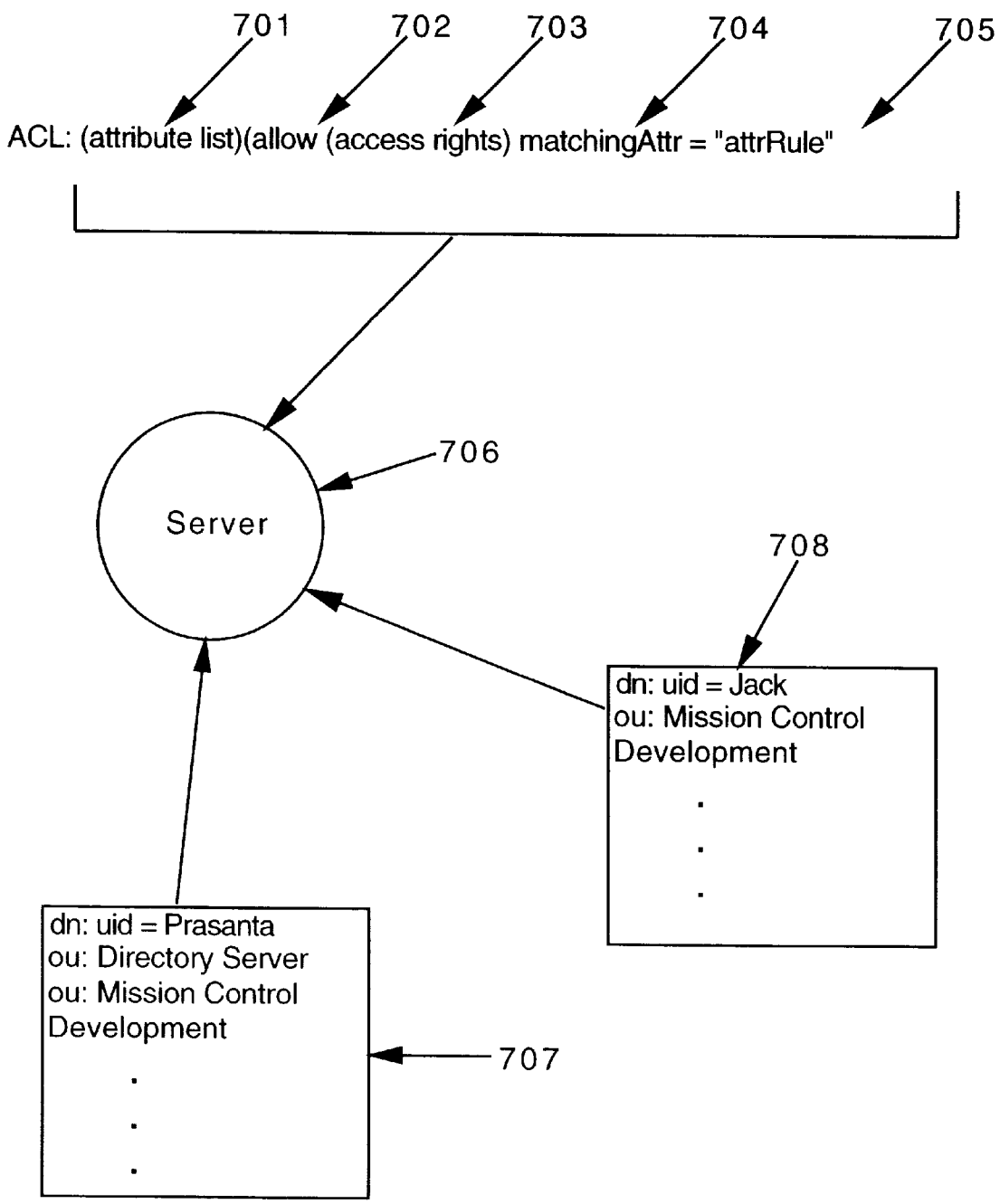
FIG. 7 is a block schematic diagram of the ACL command language structure and system interface according to the invention.

With respect to FIG. 7, the invention structures the ACL rule such that the list of attributes 701 indicates what attributes that rule applies to. The term "allow" 702 tells the Server 706 that the access right 703 is granted to the users 708 that have the desired attributes 705 where attrRule is defined as:

attrRule:=attributeName
 |attributeName <op>attributeValue
<op>:==|!=| . . .

The access rights 703 can be read, write, or any other privilege that the system supports. A specific attribute fieldname may be used or, if a match function is desired, "matchingattr" 704 (or a similar term) may be used. The match function checks to see if the user 708 has the same attribute values 705 as the user 707 who is requesting access to attributes 701. The attribute value(s) 705 are checked by the Server 706 using the attribute fieldname or match function.

Figure 8:
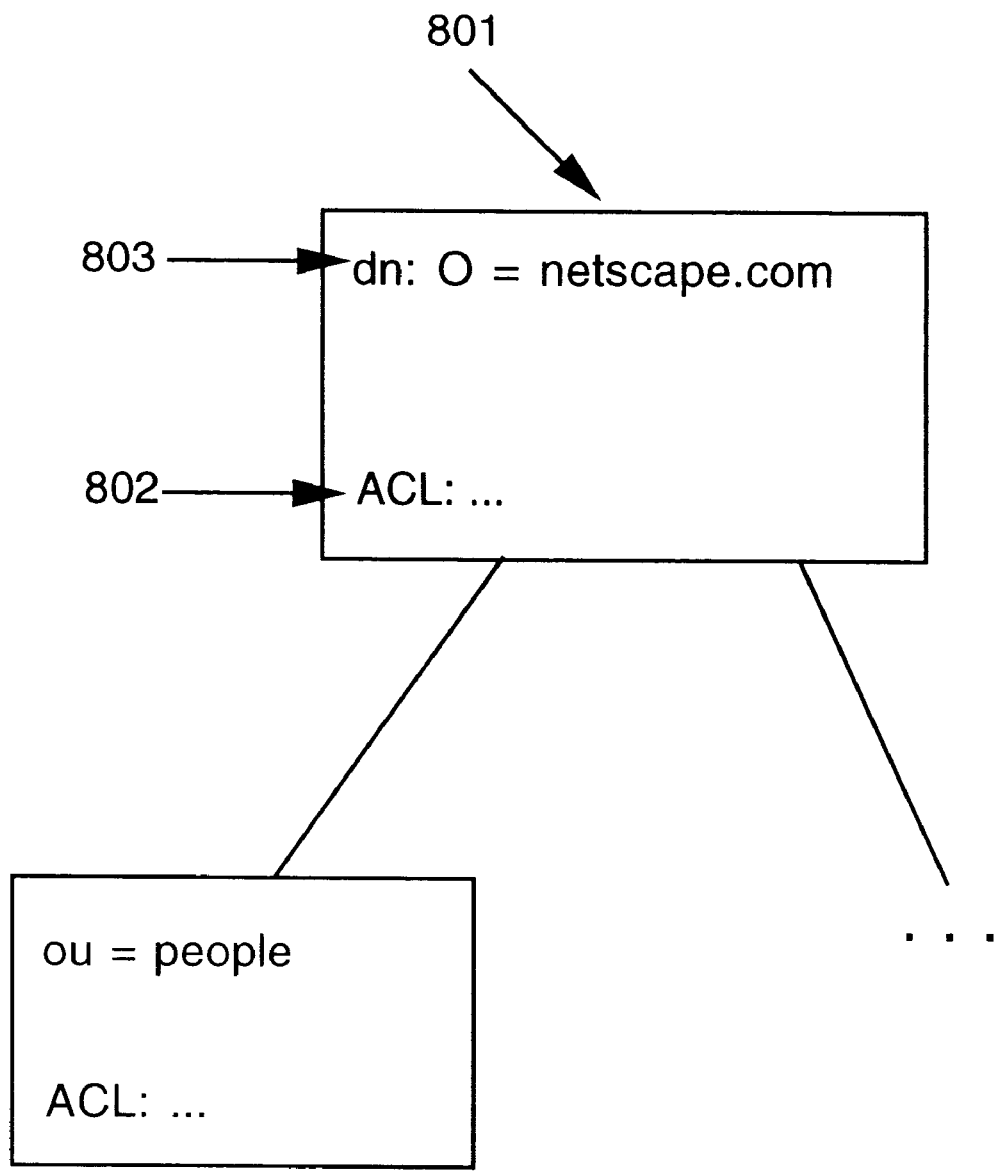
FIG. 8 is a block schematic diagram of a directory including ACLs and entries according to the invention.

Referring to FIG. 8, the ACLs 802 are stored in the directory 801 along with the entries 803. When a user accesses an entry 803 in a directory 801, the server checks the ACL 802 specified for the attributes being accessed.

The invention creates ACL rules based on the properties associated with the directory entries, thereby taking advantage of the fact that there are inherent properties associated with each entry. It does not require any changes to the schema. Rather, once the server supports the invention, the DSAdmin creates a few simple ACL rules and is done. The advantages of the invention are:

No need to create thousands of groups/roles.
No need to create thousands of ACL rules.
Highly manageable.
Cost effective.
Simple.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for a property-based access control language that controls access to directory entries in a computer environment, comprising the steps of:

providing a system administrator defined access control command;

said access control command lists the attribute values that said administrator has selected for user access;

said access control command specifies the type of access to be granted to a user; and said access control command specifies the desired attribute values that said user must have to be granted said type of access;

wherein the specific attribute fieldname associated with said desired attributes is specified; and wherein the directory server matches said desired attributes of said specific attribute fieldname with said user's attributes and allows access only if said user has said desired attributes.

2. The process of claim 1, wherein said type of access includes, but is not limited to: read, write, and any other privileges that the system supports.

3. The process of claim 1, wherein the directory server selects and analyzes a specific access control command according to the attribute being accessed.

4. A process for a property-based access control language that controls access to directory entries in a computer environment, comprising the steps of:

providing a system administrator defined access control command;

said access control command lists the attribute values that said administrator has selected for user access;

said access control command specifies the type of access to be granted to a user; and said access control command specifies the desired attribute values that said user must have to be granted said type of access;

wherein a match function is specified for said desired attributes; and wherein the directory server matches said desired attributes with said user and the owner of said list of attributes and allows access only if the two have said desired attributes.

5. An apparatus for a property-based access control language that controls access to directory entries in a computer environment, comprising:

a system administrator defined access control command;

said access control command lists the attribute values that said administrator has selected for user access;

said access control command specifies the type of access to be granted to a user; and said access control command specifies the desired attribute values that said user must have to be granted said type of access;

wherein the specific attribute fieldname associated with said desired attributes is specified; and wherein the directory server matches said desired attributes of said specific attribute fieldname with said user's attributes and allows access only if said user has said desired attributes.

6. The apparatus of claim 5, wherein said type of access includes, but is not limited to: read, write, and any other privileges that the system supports.

7. The apparatus of claim 5, wherein the directory server selects and analyzes a specific access control command according to the attribute being accessed.

8. An apparatus for a property-based access control language that controls access to directory entries in a computer environment, comprising:

a system administrator defined access control command;

said access control command lists the attribute values that said administrator has selected for user access;

said access control command specifies the type of access to be granted to a user; and said access control command specifies the desired attribute values that said user must have to be granted said type of access;

wherein a match function is specified for said desired attributes; and wherein the directory server matches said desired attributes with said user and the owner of said list of attributes and allows access only if the two have said desired attributes.

9. A program storage medium readable by a computer, tangibly embodying a program of instructions executable by the computer to perform method steps for a property-based access control language that controls access to directory entries in a computer environment, comprising the steps of:

providing a system administrator defined access control command;

said access control command lists the attribute values that said administrator has selected for user access;

said access control command specifies the type of access to be granted to a user; and said access control command specifies the desired attribute values that said user must have to be granted said type of access;

wherein the specific attribute fieldname associated with said desired attributes is specified; and wherein the directory server matches said desired attributes of said specific attribute fieldname with said user's attributes and allows access only if said user has said desired attributes.

10. The process of claim 9, wherein said type of access includes, but is not limited to: read, write, and any other privileges that the system supports.

11. The process of claim 9, wherein the directory server selects and analyzes a specific access control command according to the attribute being accessed.

12. A program storage medium readable by a computer, tangibly embodying a program of instructions executable by the computer to perform method steps for a property-based access control language that controls access to directory entries in a computer environment, comprising the steps of:

providing a system administrator defined access control command;

said access control command lists the attribute values that said administrator has selected for user access;

said access control command specifies the type of access to be granted to a user; and said access control command specifies the desired attribute values that said user must have to be granted said type of access;

wherein a match function is specified for said desired attributes; and wherein the directory server matches said desired attributes with said user and the owner of said list of attributes and allows access only if the two have said desired attributes.

* * * * *